(12) United States Patent
Lien et al.

(10) Patent No.: US 9,785,205 B2
(45) Date of Patent: Oct. 10, 2017

(54) QUICK-RELEASE DEVICE CARRIER

(71) Applicant: Dell Products, L.P., Round Rock, TX (US)

(72) Inventors: Yao-Chien Lien, Taipei (TW); Yi-Hsin Kuan, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/836,055

(22) Filed: Aug. 26, 2015

(65) Prior Publication Data
US 2017/0060176 A1 Mar. 2, 2017

(51) Int. Cl.
*G06F 1/18* (2006.01)

(52) U.S. Cl.
CPC .................. *G06F 1/187* (2013.01)

(58) Field of Classification Search
CPC ......................................... G06F 1/187
USPC .................... 361/679.33, 724–727
See application file for complete search history.

(56) References Cited

U.S. PATENT DOCUMENTS

| | | | | |
|---|---|---|---|---|
| 5,557,499 A * | 9/1996 | Reiter | | G06F 1/184 312/223.2 |
| 6,064,569 A * | 5/2000 | Sands | | G06F 1/187 361/679.32 |
| 6,231,224 B1 * | 5/2001 | Gamble | | G06F 1/184 361/679.33 |
| 6,483,107 B1 * | 11/2002 | Rabinovitz | | G06F 1/181 250/239 |
| 6,490,153 B1 * | 12/2002 | Casebolt | | G06F 1/184 361/679.33 |
| 6,927,973 B2 * | 8/2005 | Song | | H05K 7/1411 312/223.1 |
| 7,379,294 B2 * | 5/2008 | Chen | | G06F 1/187 165/122 |
| 7,483,268 B1 * | 1/2009 | King, Jr. | | G06F 1/187 248/682 |
| 7,570,484 B1 * | 8/2009 | Sivertsen | | G11B 33/125 361/679.37 |
| 8,456,832 B1 * | 6/2013 | Brigham, Jr. | | G06F 1/187 361/679.33 |
| 8,737,057 B2 * | 5/2014 | Terry | | G06F 1/187 361/679.33 |
| 8,749,966 B1 * | 6/2014 | Boudreau | | G06F 1/187 361/679.33 |
| 9,392,719 B1 * | 7/2016 | Chen | | G11B 33/124 |

(Continued)

*Primary Examiner* — Adrian S Wilson
(74) *Attorney, Agent, or Firm* — Fogarty LLP (57) ABSTRACT

Quick-release device carriers for computer chassis are described. In some embodiments, a carrier configured to couple and to decouple a device into or from a chassis may include: a front panel having a proximal edge, a distal edge opposite the proximal edge, and a handle nearest the proximal edge, where the proximal edge includes at least one protrusion; and a bracket slideable into the chassis, where the bracket includes a lateral portion and a rear portion, where the distal edge is coupled to the lateral portion via a hinge, where the rear portion includes an opening configured to accommodate an electronic connector between the device and the chassis, where the at least one protrusion is configured to latch onto at least one corresponding groove of a fixed portion of the chassis when the carrier is in a closed position, and where the fixed portion is parallel to the lateral portion.

12 Claims, 5 Drawing Sheets

(56) References Cited

U.S. PATENT DOCUMENTS

| | | | | |
|---|---|---|---|---|
| 2003/0002249 A1* | 1/2003 | Cruz | ............ | G11B 33/128 |
| | | | | 361/679.33 |
| 2006/0023413 A1* | 2/2006 | Lo | ............ | G06F 1/184 |
| | | | | 361/679.02 |
| 2007/0053169 A1* | 3/2007 | Carlson | ............ | G11B 33/12 |
| | | | | 361/727 |
| 2007/0206351 A1* | 9/2007 | Szelong | ............ | G06F 1/187 |
| | | | | 361/726 |
| 2008/0266781 A1* | 10/2008 | Olesiewicz | ............ | G06F 1/187 |
| | | | | 361/679.33 |
| 2008/0278856 A1* | 11/2008 | Peng | ............ | G11B 33/124 |
| | | | | 360/244.3 |
| 2009/0129009 A1* | 5/2009 | Zhang | ............ | G11B 33/12 |
| | | | | 361/679.34 |
| 2009/0279244 A1* | 11/2009 | Crippen | ............ | G06F 1/187 |
| | | | | 361/679.33 |
| 2011/0038110 A1* | 2/2011 | Ikunami | ............ | B60R 11/0235 |
| | | | | 361/679.01 |
| 2012/0236491 A1* | 9/2012 | Wallace | ............ | G06F 1/187 |
| | | | | 361/679.33 |
| 2015/0313028 A1* | 10/2015 | Bell | ............ | F16F 3/12 |
| | | | | 361/679.35 |

* cited by examiner

QUICK-RELEASE DEVICE CARRIER

FIELD

This disclosure relates generally to computer systems, and more specifically, to quick-release device carriers for computer chassis.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some cases, certain IHSs may be housed within a chassis. Generally speaking, a chassis is a rack or enclosure capable of providing shared power, cooling, networking, and/or management infrastructure to a plurality of IHSs, such as server blades, input/output (I/O) modules, storage devices, switches, etc. One or more devices, including one or more Hard Disk Drives (HDDs) or Solid State Drives (SSDs), may be inserted into the chassis using a mechanism known as a "device carrier."

SUMMARY

Embodiments of quick-release device carriers for computer chassis are described herein. In an illustrative, non-limiting embodiment, a carrier configured to couple and to decouple a device into or from a chassis may include a front panel having a proximal edge, a distal edge opposite the proximal edge, and a handle nearest the proximal edge, where the proximal edge includes at least one protrusion; and a bracket slideable into the chassis, where the bracket includes a lateral portion and a rear portion, where the distal edge is coupled to the lateral portion via a hinge, where the rear portion includes an opening configured to accommodate an electronic connector between the device and the chassis, where the at least one protrusion is configured to latch onto at least one corresponding groove of a fixed portion of the chassis when the carrier is in a closed position, and where the fixed portion is parallel to the lateral portion.

The device may include a Hard Disk Drive (HDD) or a Solid State Drive (SSD). The handle may allow opening of the carrier by swiveling the front panel around the hinged edge to remove the at least one protrusion from the at least one groove. The front panel may allow the device to be removed from the chassis by pulling the bracket outward from the chassis to disconnect an electronic connector of the device from a backplane of the chassis.

In some implementations, the at least one protrusion includes two protrusions, and the at least one corresponding groove includes two grooves. Moreover, the bracket may be L-shaped. The fixed portion may include a light guide optically coupled to a light source in a backplane of the chassis that is configured to indicate an operational status of the device. Additionally or alternatively, the lateral portion may include a light guide optically coupled to a light source in a backplane of the chassis that is configured to indicate an operational status of the device.

In another illustrative, non-limiting embodiment, a modular chassis may include a rack having a plurality of blade compartments, each blade compartment configured to receive at least one IHS; and an IHS coupled to a given blade compartment, where the IHS includes a chassis having a plurality of slots, each slot configured to receive an HDD or SSD via a carrier, the carrier comprising: a front panel having a proximal edge, a distal edge opposite the proximal edge, and a handle nearest the proximal edge, where the proximal edge includes at least one protrusion; and a bracket slideable into the chassis, where the bracket includes a lateral portion and a rear portion, where the distal edge is coupled to the lateral portion via a hinge, where the rear portion includes an opening configured to accommodate an electronic connector between the HDD or SSD and the chassis, where the at least one protrusion is configured to latch onto at least one corresponding groove of a fixed portion of the chassis when the carrier is in a closed position, and where the fixed portion is parallel to the lateral portion.

In yet another illustrative, non-limiting embodiment, a method may include inserting a device carrier into a slot of a chassis, the device carrier comprising: a front panel having a proximal edge, a distal edge opposite the proximal edge, and a handle nearest the proximal edge, where the proximal edge includes at least one protrusion; and a bracket slideable into the chassis, where the bracket includes a lateral portion and a rear portion, where the distal edge is coupled to the lateral portion via a hinge, where the rear portion includes an opening configured to accommodate an electronic connector between the device and the chassis, where the at least one protrusion is configured to latch onto at least one corresponding groove of a fixed portion of the chassis when the carrier is in a closed position, and where the fixed portion is parallel to the lateral portion; and inserting a device into the device carrier until the electronic connector couples the device to a backplane of the chassis.

The method may include closing the carrier by swiveling the front panel around the hinged edge using the handle to latch the at least one protrusion into the at least one groove. The method may include opening the carrier by swiveling the front panel around the hinged edge using the handle to remove the at least one protrusion from the at least one groove. The method may include removing the device from the chassis by pulling the bracket outward from the chassis to disconnect an electronic connector of the device from the backplane.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail in FIG. 5.

As described above, IHSs may be physically housed within a modular chassis system. Modular chassis or racks are physical enclosures capable of providing shared power, cooling, networking, and/or management infrastructure to a plurality of IHSs, such as server blades, input/output (I/O) modules, storage devices, switches, etc. Examples of storage devices include, but are not limited to, Hard Disk Drives (HDDs), Solid State Drives (SSD), etc. To allow each of these components to be added to and/or removed from the chassis, a carrier system may be used whereby each component is coupled to a device carrier, and the device carrier is then inserted into (and removable from) one of a plurality of slots of the chassis.

Figure 1:
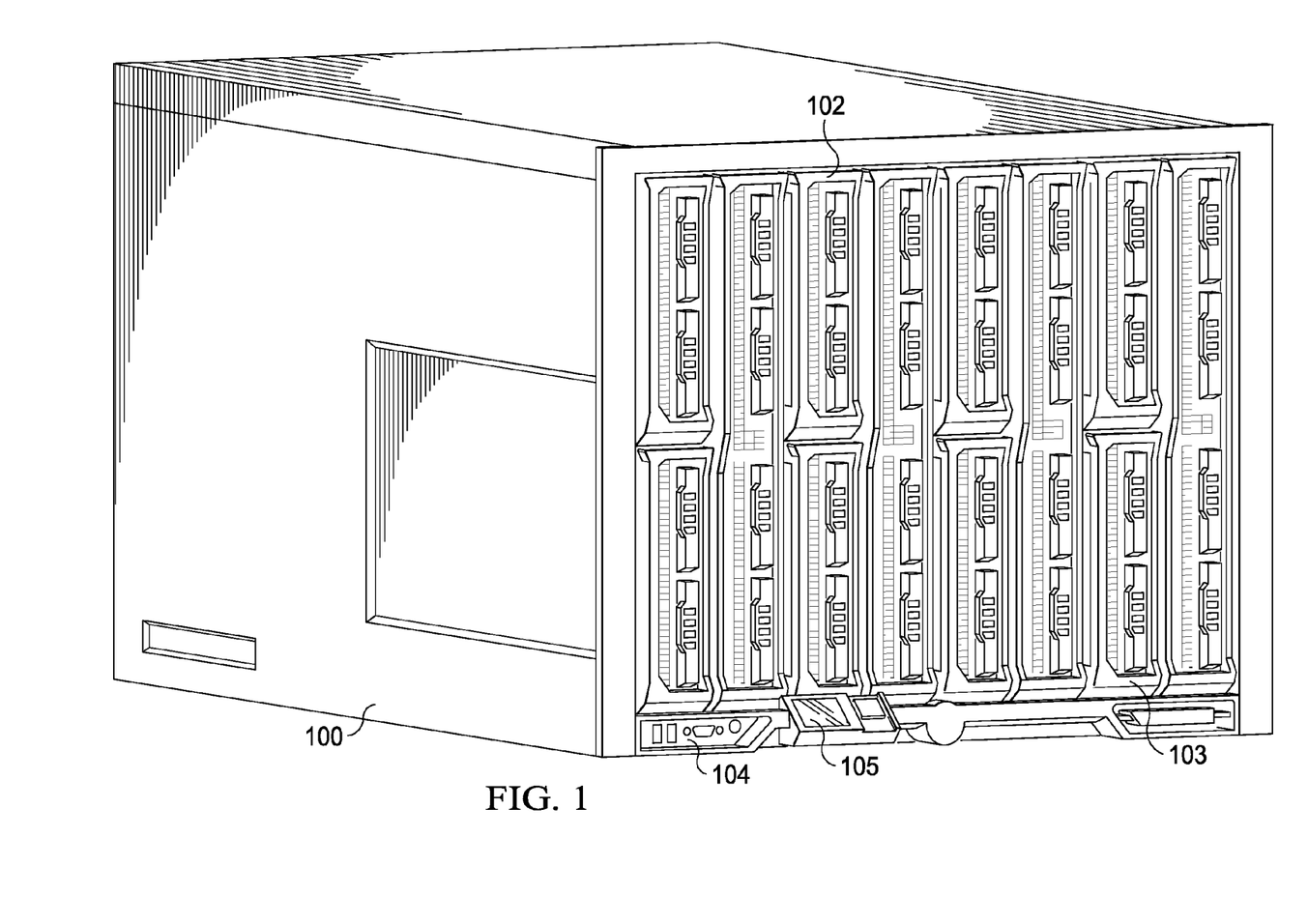
FIG. 1 shows a three-dimensional view of an example of a modular chassis according to some embodiments.

FIG. 1 shows a three-dimensional view illustrating the front end of an example of modular chassis 100 according to some embodiments. Chassis 100 is configured to house a plurality of components, including device carriers 102 and 103, for example. In some cases, at least one of device carriers 102 or 103 may be a quick-release device carrier described herein. In addition, chassis 100 may include display 105 and I/O connectors 104. Display 105 may provide certain status and configuration information regarding the chassis or its various components, whereas I/O connectors 104 may include ports and interfaces such as Universal Serial Bus (USB), audio, video, serial, parallel, Ethernet, etc. that enable a user to interact with the chassis.

Modular chassis 100 may also include a backplane or midplane (not shown) configured to perform internal connections between elements seen in the rear and the front ends of chassis 100. For example, in some cases, communication between the inserted components (e.g., housed by device carriers 102 and 103) and/or rear modules (not shown) may be performed via a vertical, passive backplane or midplane.

The backplane or midplane may also include a printed circuit board (PCB) or the like with conductive traces (e.g., copper, etc.) effecting connections between the respective pins of corresponding connectors. For sake of simplicity, the terms "midplane" and "backplane" are used interchangeably herein.

In some implementations, the various modules and components of FIG. 1 may be inserted or removed from chassis 100 while chassis 100 is running or turned on ("hot swapping"). In various configurations, chassis 100 may hold any number (e.g., 32, 64, etc.) of quarter-height device carriers, half-height device carriers, full-height device carriers, or any mix of them. It should be noted, however, that modular chassis 100 is described for sake of illustration only, and that many variations (e.g., number of components, distribution of components, etc.) may be present in other chassis.

Figure 2:
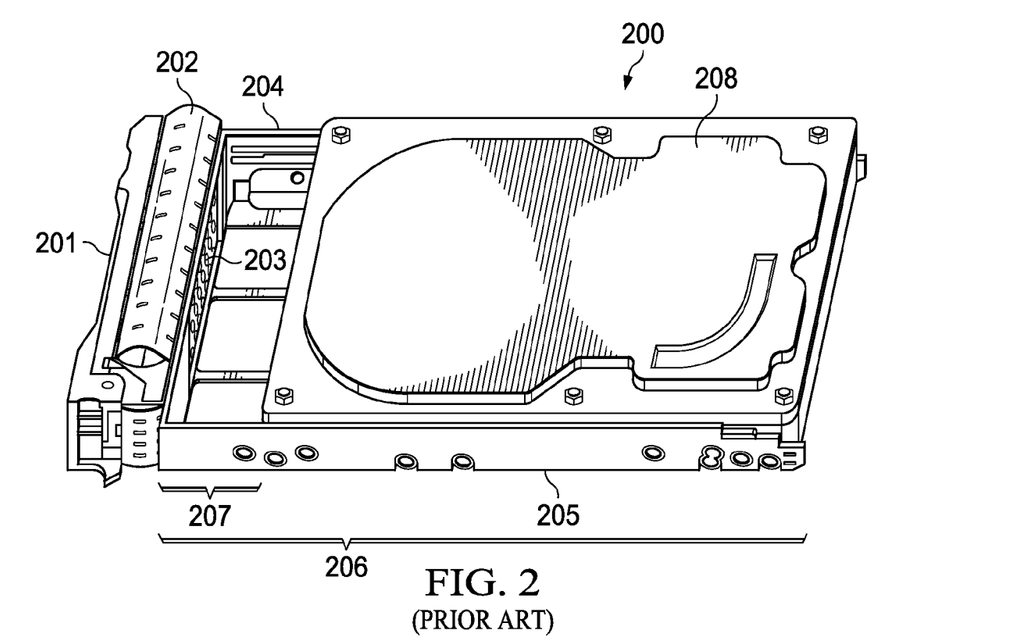
FIG. 2 shows a three-dimensional view of an example of a conventional device carrier, labeled as "prior art."

FIG. 2 is a three-dimensional view of an example of a prior art, conventional device carrier 200 with fixed physical dimensions. As shown, carrier 200 includes front panel 201 and lateral rails 204 and 205, which are configured to hold electronic device (e.g., HDD) 208. Ventilation element 203 of front panel 201 allows device 208 to be cooled during operation, and spring element 202 allows conventional device carrier 200 to remain secure upon insertion into a slot of chassis 100.

Lateral rails 204 and 205 of conventional device carrier 200 have a fixed, non-adjustable length 206. Because the depth of device 208 is shorter than length 206, empty space 207 results between device 208 and front panel 201.

The inventors hereof have identified that the main purpose of an SSD or HDD carrier is to help with the hard disk installation and release into and from corresponding connectors of the backplane. However, conventional carriers have adopted complex components and relied on manual to assembly methods to configure carrier sets in the production line, in addition to having a very high unit cost. Moreover, conventional device carriers typically require the use of tools in order to be inserted and removed into a chassis. To address these, and other problems, the inventors hereof have developed various tool-less, quick-release device carriers for a modular chassis, which are described in more detail below.

Figure 3A:
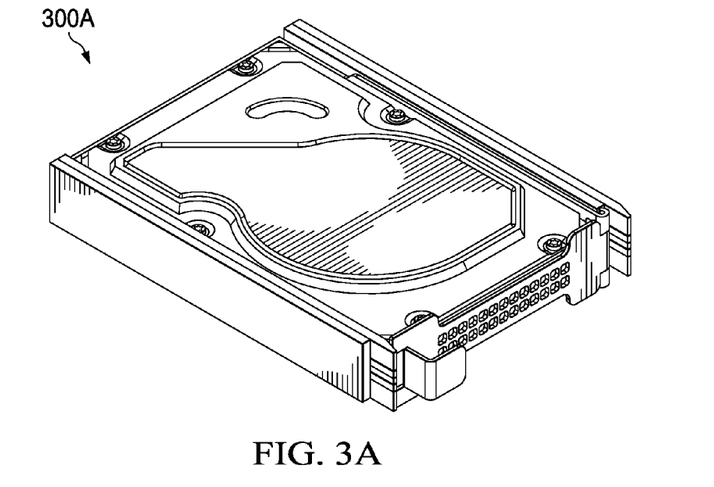
FIGS. 3A, 3B, and 4 show three-dimensional views of an example of a quick release device carrier according to some embodiments.
Figure 3B:
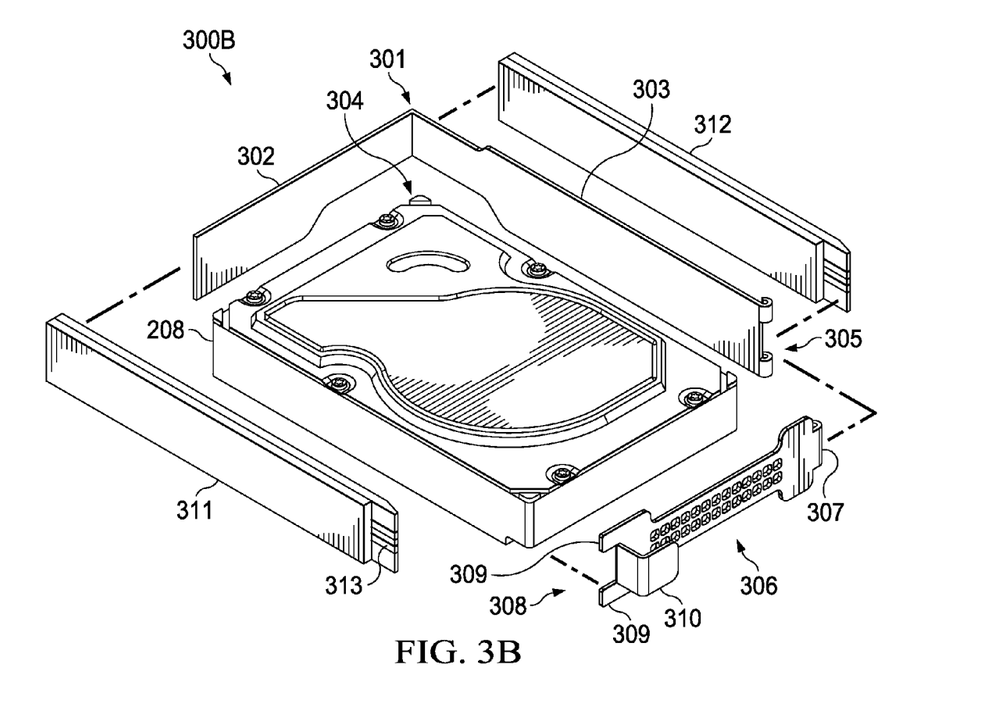
Figure 4:
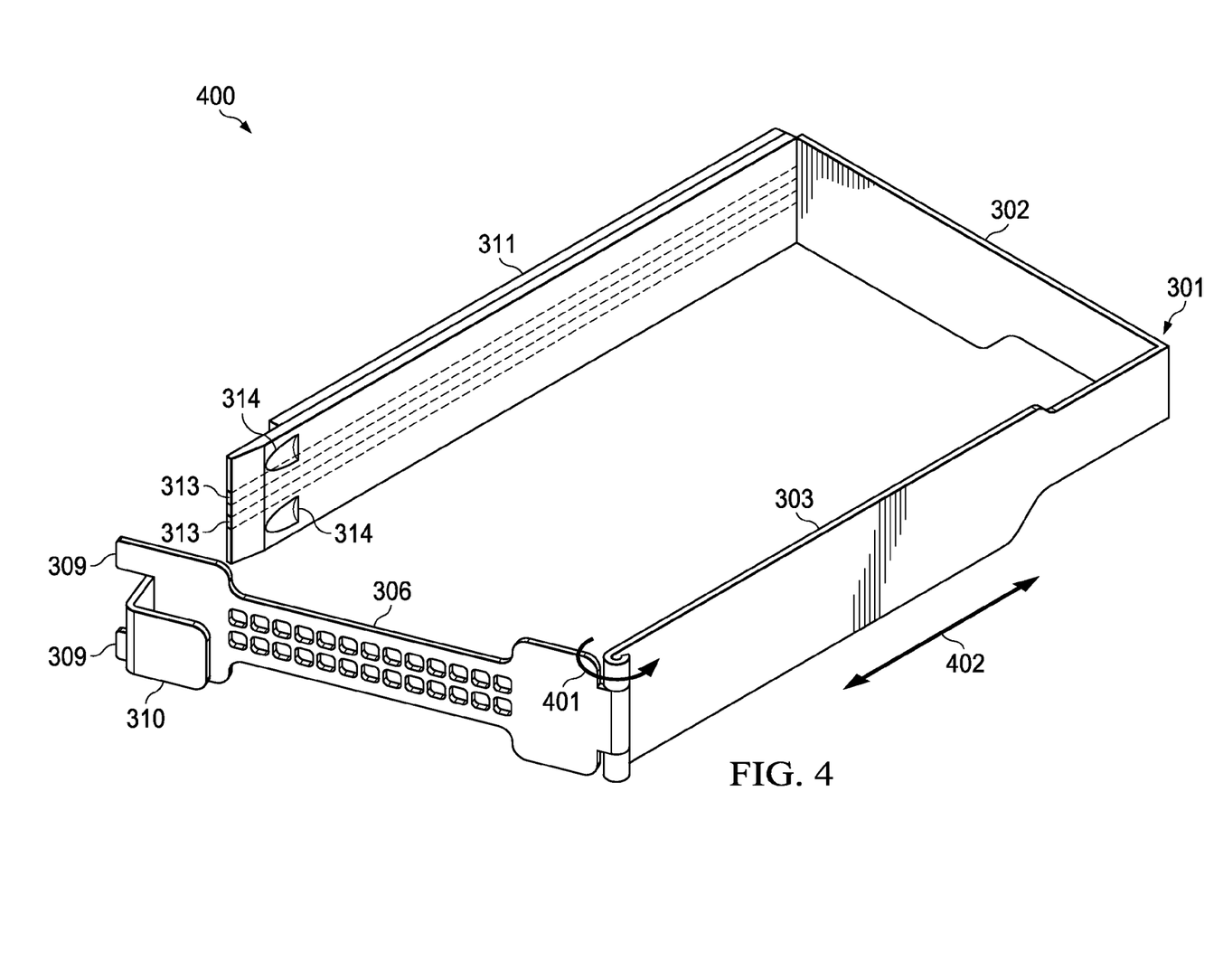

FIG. 3A shows a three-dimensional view of an example of quick release device carrier 300A holding an HDD or SSD, FIG. 3B shows an exploded view of those same components, and FIG. 4 shows another view from a different angle and without the HDD or SSD, according to some embodiments. As illustrated, carrier 300B includes bracket 301 having rear portion 302 and lateral portion 303 disposed perpendicularly with respect to each other to create an overall "L-shaped" piece. Rear portion 302 includes cutout portion or opening 304 configured to accommodate an electronic connector between HDD or SSD 208 and a corresponding connector built upon the mid or backplane of a chassis (not shown). Lateral portion 303 includes hinge 305 configured to receive a pin or the like.

Carrier 300 also includes front panel 306 having distal edge 307 configured to be coupled to hinge portion 305 of bracket 301 such that, when a pin is in place, front panel 306 swivels around axis 401 to open or close carrier 300 using handle 310, as shown in carrier 400 of FIG. 4. Meanwhile, proximal edge 308 of front panel 306 includes one or more tabs or protrusions 309 configured to latch onto one or more corresponding grooves or notches 314 of first fixed portion 311 of the chassis (parallel to lateral portion 303) when front panel 306 is in a closed position.

In some cases, at least one of fixed portions 311 or 312 may include light guides 313 configured to be optically coupled to a light source in a backplane of the chassis that to indicate an operational status of HDD or SSD 208. In some implementations, protrusions 309 (or the tips of protrusions 309) may include a transparent or translucent material in order not to interfere with the propagation of light through light guides 313. Additionally or alternatively, fixed portion 311 may be made of a thickness sufficient to accommodate light guides 313 as well as the corresponding grooves or notches 314 that keep front panel 305 in a closed position by accommodating protrusions 313. Additionally or alternatively, lateral portion 305 may itself include light guide 313.

In operation, a user may first insert device carrier 300 into a slot of chassis 100 in direction 402 parallel to fixed portion 311. Then the user may insert a device (e.g., HDD or SSD 208) into carrier 300 with front panel 306 open, and may slide the device into the chassis until its electric connector couples the device to the chassis' mid or backplane—which may be visually confirmed, for example, by a display in the front of the chassis using light guides 313. Then, the user may close device carrier 300 by swiveling front panel 306 around hinged edge 305 using handle 310 to latch protrusions 309 into the corresponding grooves 314 of fixed portion 311 and/or light guide 313.

To service HDD or SSD 208, the user may open carrier 300 by swiveling front panel 306 around hinged edge 305 using handle 310 to remove the at least one protrusion 309 from the at least one groove 314. At this point, the connector(s) between HDD or SSD 208 and the backplane are still coupled to each other. Accordingly, to remove HDD or SSD 208 from the chassis, the use may pull the entire open front panel 306 using handle 310 in direction 402 parallel to lateral portion 303, thus also pulling bracket 301 outward from the chassis to cause the HDD or SSD 208 connector to disconnect from the backplane. When the user pulls out the parts 302 and 303, connector area 304 is released from chassis 100 itself.

In summary, the quick-release device carriers described herein are intuitive to a user, allowing him or her to "slide in the carrier closed to lock" and "unlock to open and pull out." These carriers are structurally robust and secure with an optimized mechanical architecture that can be used, for example, with 1.8" SSDs, 2.5" and 3.5" HDDs, or any other kinds of devices. Moreover, these quick-release device carrier structures have a minimal part count, so that the manufacturing cost, assembly price, and service costs are much less expensive than with conventional carriers.

In various embodiments, a quick-release device carrier such as described herein may be used in legacy enclosures, and in enclosures designed for a shorter carrier that does not have the unused space in front of the device, as traditional enclosures do. For example, a quick-release device carrier may have lateral rails that may be adjusted in length at the point of assembly with the device (e.g., HDD or SSD), to fit whichever enclosure design is needed, with negligible additional complexity and cost.

Figure 5:
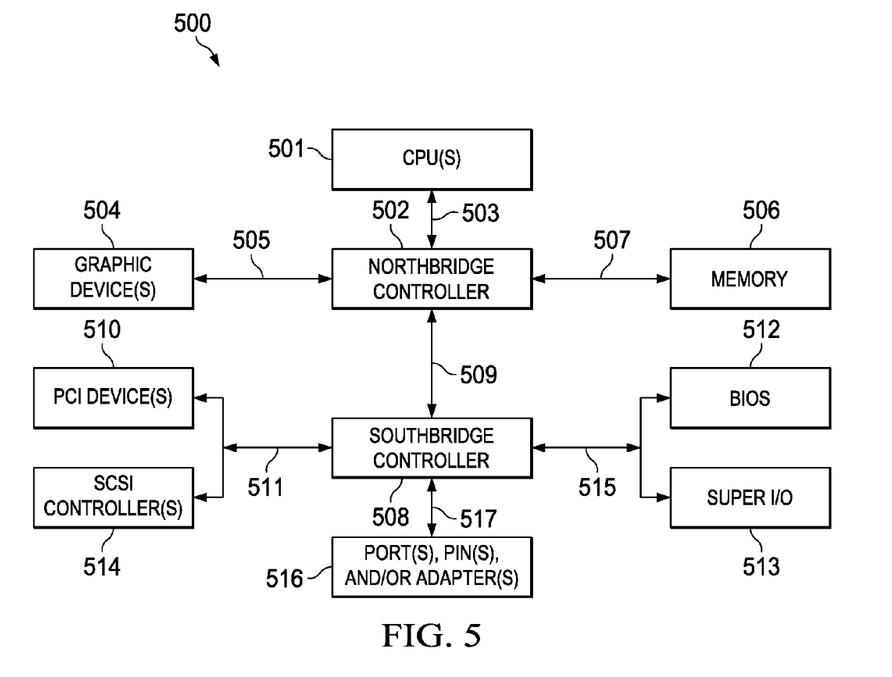
FIG. 5 is a block diagram of an example of an Information Handling System (IHS) according to some embodiments.

FIG. 5 is a block diagram an example of IHS 500 which may be used in chassis 100. As shown, IHS 500 includes one or more CPUs 501. In various embodiments, IHS 500 may be a single-processor system including one CPU 501, or a multi-processor system including two or more CPUs 501 (e.g., two, four, eight, or any other suitable number). CPU(s) 501 may include any processor capable of executing program instructions. For example, in various embodiments, CPU(s) 501 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 501 may commonly, but not necessarily, implement the same ISA.

CPU(s) 501 are coupled to northbridge controller or chipset 501 via front-side bus 503. Northbridge controller 502 may be configured to coordinate I/O traffic between CPU(s) 501 and other components. For example, in this particular implementation, northbridge controller 502 is coupled to graphics device(s) 504 (e.g., one or more video cards or adaptors, etc.) via graphics bus 505 (e.g., an Accelerated Graphics Port or AGP bus, a Peripheral Component Interconnect or PCI bus, etc.). Northbridge controller 502 is also coupled to system memory 506 via memory bus 507. Memory 506 may be configured to store program instructions and/or data accessible by CPU(s) 501. In various embodiments, memory 506 may be implemented using any suitable memory technology, such as static RAM (SRAM), synchronous dynamic RAM (SDRAM), nonvolatile/Flash-type memory, or any other type of memory.

Northbridge controller 502 is coupled to southbridge controller or chipset 508 via internal bus 509. Generally speaking, southbridge controller 508 may be configured to handle various of IHS 500's I/O operations, and it may provide interfaces such as, for instance, Universal Serial Bus (USB), audio, serial, parallel, Ethernet, etc., via port(s), pin(s), and/or adapter(s) 516 over bus 517. For example, southbridge controller 508 may be configured to allow data to be exchanged between IHS 500 and other devices, such as other IHSs attached to a network. In various embodiments, southbridge controller 508 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 508 may also enable connection to one or more keyboards, keypads, touch screens, scanning devices, voice or optical recognition devices, or any other devices suitable for entering or retrieving data. Multiple I/O devices may be present in IHS 500. In some embodiments, I/O devices may be separate from IHS 500 and may interact with IHS 50 through a wired or wireless connection.

As shown, southbridge controller 508 is further coupled to one or more PCI devices 510 (e.g., modems, network cards, sound cards, video cards, etc.) and to one or more SCSI controllers 514 via parallel bus 511. Southbridge controller 508 is also coupled to Basic I/O System (BIOS) 512 and to Super I/O Controller 513 via Low Pin Count (LPC) bus 515.

BIOS 512 includes non-volatile memory having program instructions stored thereon. Those instructions may be usable CPU(s) 501 to initialize and test other hardware components and/or to load an Operating System (OS) onto IHS 500. Super I/O Controller 513 combines interfaces for a variety of lower bandwidth or low data rate devices. Those devices may include, for example, floppy disks, parallel ports, keyboard and mouse, temperature sensor and fan speed monitoring/control, etc.

In some cases, IHS 500 may be configured to provide access to different types of computer-accessible media separate from memory 506. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 500 via northbridge controller 502 and/or southbridge controller 508.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 500 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 502 may be combined with southbridge controller 508, and/or be at least partially incorporated into CPU(s) 501. In other implementations, one or more of the devices or components shown in FIG. 5 may be absent, or one or more other components may be added. Accordingly, systems and methods described herein may be implemented or executed with other IHS configurations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A carrier configured to couple a device to a chassis and to decouple the device from the chassis, the carrier comprising:
   a front panel having a proximal edge, a distal edge opposite the proximal edge, and a handle nearest the proximal edge, wherein the proximal edge includes at least one protrusion parallel to the front panel; and
   a bracket slideable into the chassis, wherein the bracket includes a lateral portion and a rear portion, wherein the distal edge of the front panel is coupled to the lateral portion of the bracket via a hinge, wherein the rear portion includes an opening configured to accommodate an electronic connector between the device and the chassis, wherein the at least one protrusion is configured to latch onto at least one corresponding groove of a fixed portion of the carrier when the carrier is in a closed position, wherein the fixed portion is parallel to the lateral portion, and wherein the device and carrier are concurrently removable from the chassis by swiveling the front panel around the hinge so that the at least one protrusion is extracted from the at least one corresponding groove, and pulling the front panel away from the chassis in a direction parallel to the lateral portion to disconnect the electronic connector between the device and the chassis.

2. The carrier of claim 1, wherein the device includes a Hard Disk Drive (HDD).

3. The carrier of claim 1, wherein the device includes a Solid State Drive (SSD).

4. The carrier of claim 1, further comprising: a light guide coupled to the fixed portion, wherein the at least one protrusion is transparent or translucent such that it allows propagation of light from a light source in a backplane of the chassis to the front panel through the light guide to indicate an operational status of the device.

5. The carrier of claim 1, wherein the at least one protrusion includes two protrusions, and wherein the at least one corresponding groove includes two grooves.

6. The carrier of claim 1, wherein the bracket is L-shaped.

7. A modular chassis, comprising:
   a rack having a plurality of blade compartments, each blade compartment configured to receive at least one Information Handling System (IHS); and
   an IHS coupled to a given blade compartment, wherein the IHS includes a chassis having a plurality of slots, each slot configured to receive a Hard Disk Drive (HDD) or Solid State Drive (SSD) via a carrier, the carrier comprising:
   a front panel having a proximal edge, a distal edge opposite the proximal edge, and a handle nearest the proximal edge, wherein the proximal edge includes at least one protrusion parallel to the front panel;

a bracket slideable into the chassis, wherein the bracket includes a lateral portion and a rear portion, wherein the distal edge of the front panel is coupled to the lateral portion of the bracket via a hinge, wherein the rear portion includes an opening configured to accommodate an electronic connector between the HDD or SSD and the chassis, wherein the at least one protrusion is configured to latch onto at least one corresponding groove of a fixed portion of the carrier when the carrier is in a closed position, wherein the fixed portion is parallel to the lateral portion, wherein the carrier is insertable into the chassis with the device disposed in the carrier and with the front panel closed so that the at least one protrusion is settled in the at least one corresponding groove, and wherein the device and carrier are concurrently removable from the chassis by opening the front panel, swiveling the front panel around the hinge so that the at least one protrusion is out from the at least one corresponding groove, and pulling the opened front panel away from the chassis in a direction parallel to the lateral portion to disconnect the electronic connector.

8. The modular chassis of claim 7, wherein the carrier further comprises: a light guide coupled to the fixed portion or to the lateral portion, wherein the at least one protrusion is transparent or translucent such that it allows propagation of light from a light source in a backplane of the chassis to the front panel through the light guide to indicate an operational status of the HDD or SDD.

9. The modular chassis of claim 7, wherein the at least one protrusion includes two protrusions, and wherein the at least one corresponding groove includes two grooves.

10. The modular chassis of claim 7, wherein the bracket is L-shaped.

11. A method, comprising:
inserting a device carrier into a slot of a chassis, the device carrier comprising:
a front panel having a proximal edge, a distal edge opposite the proximal edge, and a handle nearest the proximal edge, wherein the proximal edge includes at least one protrusion parallel to the front panel;
a bracket slideable into the chassis, wherein the bracket includes a lateral portion and a rear portion, wherein the distal edge of the front panel is coupled to the lateral portion of the bracket via a hinge, wherein the rear portion includes an opening configured to accommodate an electronic connector between a device and the chassis, wherein the at least one protrusion is configured to latch onto at least one corresponding groove of a fixed portion of the carrier when the carrier is in a closed position, wherein the fixed portion is parallel to the lateral portion, wherein the carrier is inserted into the chassis with the device disposed in the carrier and with the front panel closed so that the at least one protrusion is settled in the at least one corresponding groove; and
removing the device and carrier from the chassis concurrently by opening the front panel, swiveling the front panel around the hinge so that the at least one protrusion is out from the at least one corresponding groove, and pulling the opened front panel away from the chassis in a direction parallel to the lateral portion to disconnect the electronic connector.

12. The method of claim 11, wherein the device carrier further comprises a light guide coupled to the fixed portion or to the lateral portion, wherein the at least one protrusion is transparent or translucent such that it allows propagation of light from a light source in a backplane of the chassis to the front panel through the light guide to indicate an operational status of the device.

* * * * *